Jan. 27, 1959  G. B. LOPER ET AL  2,871,089
RECORDING CAMERA FOR MONITORING SEISMIC WAVES
Filed Nov. 28, 1952  4 Sheets-Sheet 1

INVENTOR
GEORGE B. LOPER
ROBERT R. PITTMAN
BY
ATTORNEY

Jan. 27, 1959   G. B. LOPER ET AL   2,871,089
RECORDING CAMERA FOR MONITORING SEISMIC WAVES
Filed Nov. 28, 1952   4 Sheets-Sheet 2

INVENTOR
GEORGE B. LOPER
ROBERT R. PITTMAN
BY D. Carl Richards
ATTORNEY

Jan. 27, 1959    G. B. LOPER ET AL    2,871,089
RECORDING CAMERA FOR MONITORING SEISMIC WAVES
Filed Nov. 28, 1952    4 Sheets-Sheet 3

INVENTOR
GEORGE B. LOPER
ROBERT R. PITTMAN
BY
ATTORNEY

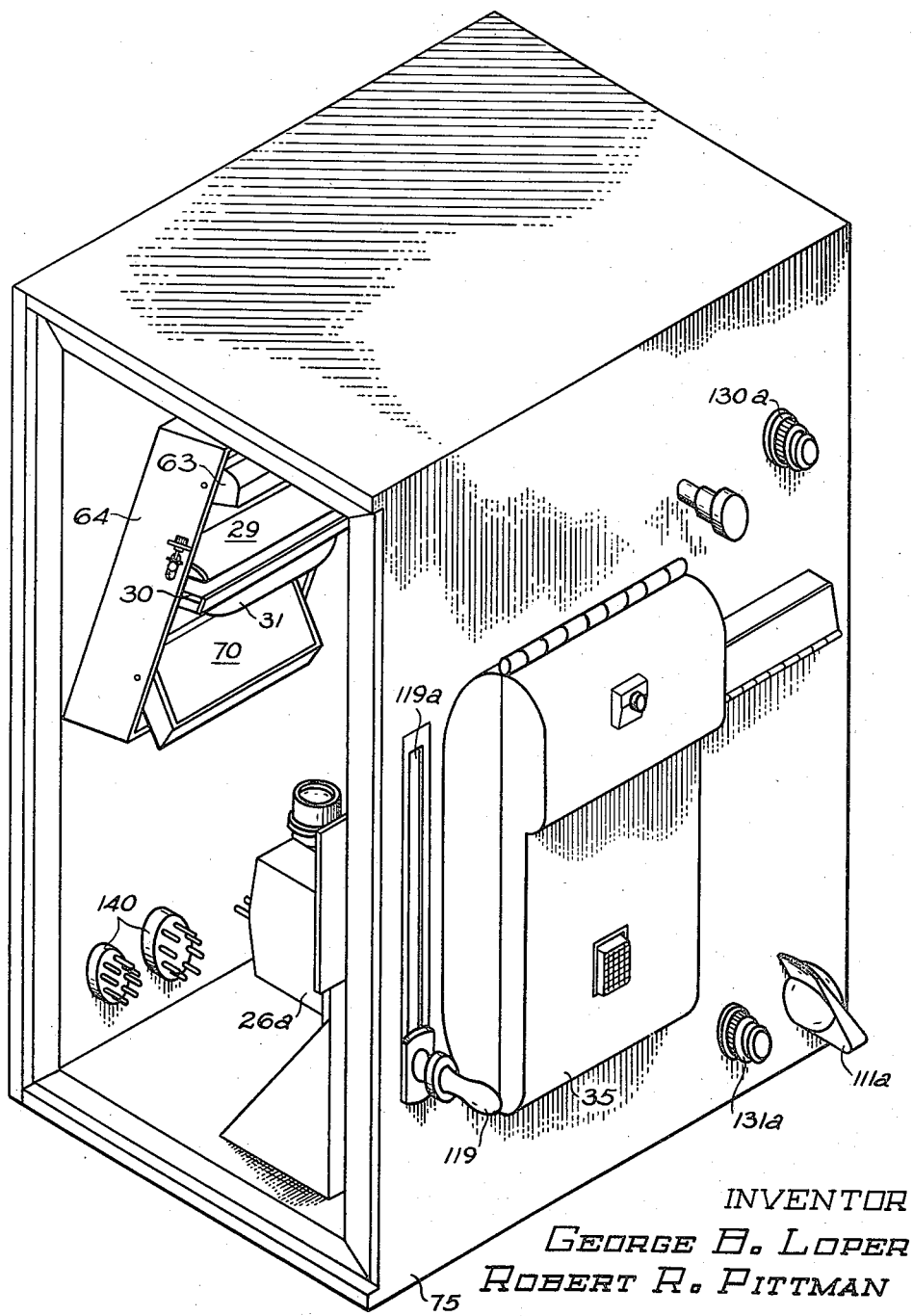

United States Patent Office 2,871,089
Patented Jan. 27, 1959

2,871,089

RECORDING CAMERA FOR MONITORING SEISMIC WAVES

George B. Loper, Dallas, Tex., and Robert R. Pittman, Tulsa, Okla., assignors, by mesne assignments, to Socony Mobil Oil Company, Inc., a corporation of New York Application November 28, 1952, Serial No. 322,982

17 Claims. (Cl. 346—109)

This invention relates to recording seismic waves and more particularly to the simultaneous impression of such waves on a phonographically reproducible medium and on a visual monitoring medium.

In seismic exploration it has long been the practice to detonate an explosive charge at a sending station and to receive reflected and/or refracted energy components of the waves thus generated at points spaced along the earth's surface from the sending location and then recording in graphical form representations of earth movement on a time scale measured from the instant of detonation of the explosive charge. As exploration techniques have extended studies from areas which are readily explored seismically to more difficult areas, various techniques have been introduced in an effort more readily to delineate and understand the acoustic nature of such difficult areas. Further, the geophysicist has come to a better understanding of his working tools and in general demands increasingly greater efficiency in their use.

Considerable attention has been given to conversion of new ideas into working systems. One such system is characterized by storage of seismic data in a phonographically reproducible form whereby the signals thus stored may be reproduced or played back and modified or otherwise operated upon to produce secondary records visual in nature for ultimate use. In conventional practice the record ultimately used has come to be more or less standard in form comprising undulating lines extending in a side by side relation along the length of a recording strip having a time scale along its length. Where such records are produced at the outset, that is in the course of the seismic field procedures, an operator immediately has before him his final data and may at the site at which it was obtained evaluate it in a preliminary manner for the direction of further seismic operations. In contrast, some phonographically reproducible records, particularly those in magnetic form, are represented by fields of force not perceptible to the eye and difficult to evaluate except with the aid of considerable reproducing equipment not feasibly maintained as a part of a field exploration unit. In this case there is an apparent need for a visual indication of the data obtained as a more or less necessary tool in guiding the step-by-step process having as its end result complete coverage of a given seismic prospect. It is desirable to provide such indication with a minimum of equipment other than that for producing the phonographically reproducible record.

In accordance with the present invention there is provided a system for producing a secondary record immediately available to an operator to aid in evaluating and directing his field procedures. The secondary record is made coincident with the production of the phonographically reproducible record.

In accordance with the present invention seismic information is recorded as variations in a space relation along the length of a phonographically reproducible medium proportional to the time variations in the seismic signals and simultaneously a light beam is moved in a given plane with an amplitude corresponding to the instantaneous magnitudes of the seismic signals. A film is then exposed during relative movement between it and the apparent image of the light beam in said plane to produce an exposure thereof corresponding with the seismic signals. The film is developed in situ to provide a visual image of the data recorded in phonographically reproducible form and the film is removed and inspected before producing further records phonographically reproducible in form.

In a more particular aspect the invention provides a means for deflecting in a given plane a beam of light with a magnitude representative of the instantaneous values of the magnitude of a condition. Means are provided for producing an image of the deflection of the beam of light, and a film is positioned in an image-viewing position. Means are then provided for producing at uniform speed relative movement between the film and the image for recording with respect the time instantaneous changes in the values of the magnitude of the condition. Further, in accordance with the present invention, a camera of the self-developing type is positioned in a beam image viewing location. Lens means supported for relative movement between the film and the beam image and mutually perpendicular to the light beam and to movements of the light beam focus the beam image onto the film.

For a more complete description of the invention, reference may now be had to the following description taken in conjunction with the accompanying drawings in which.

Figure 3:
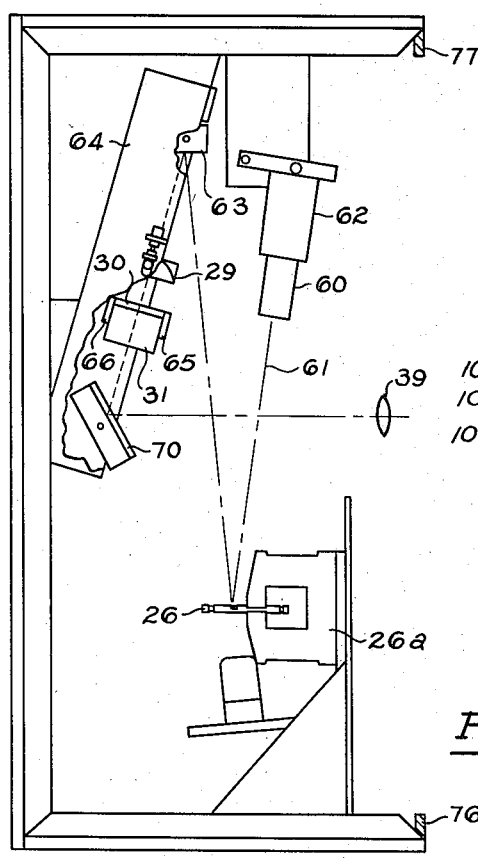
Figure 6:
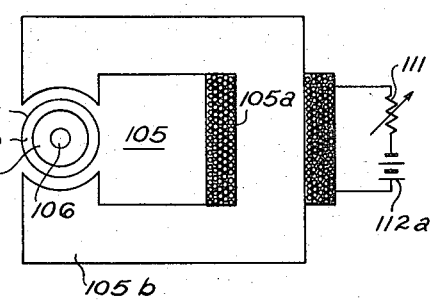
Figure 7:
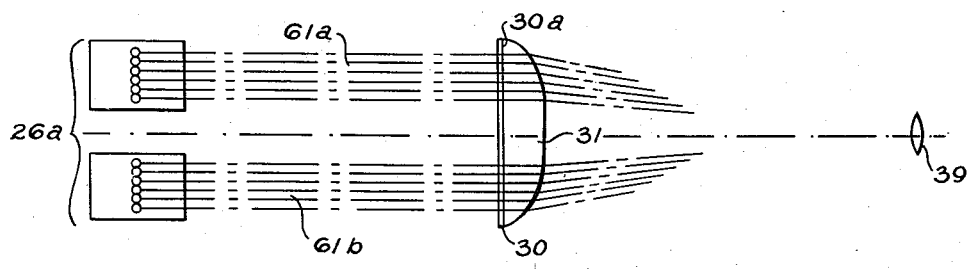
Figure 4:
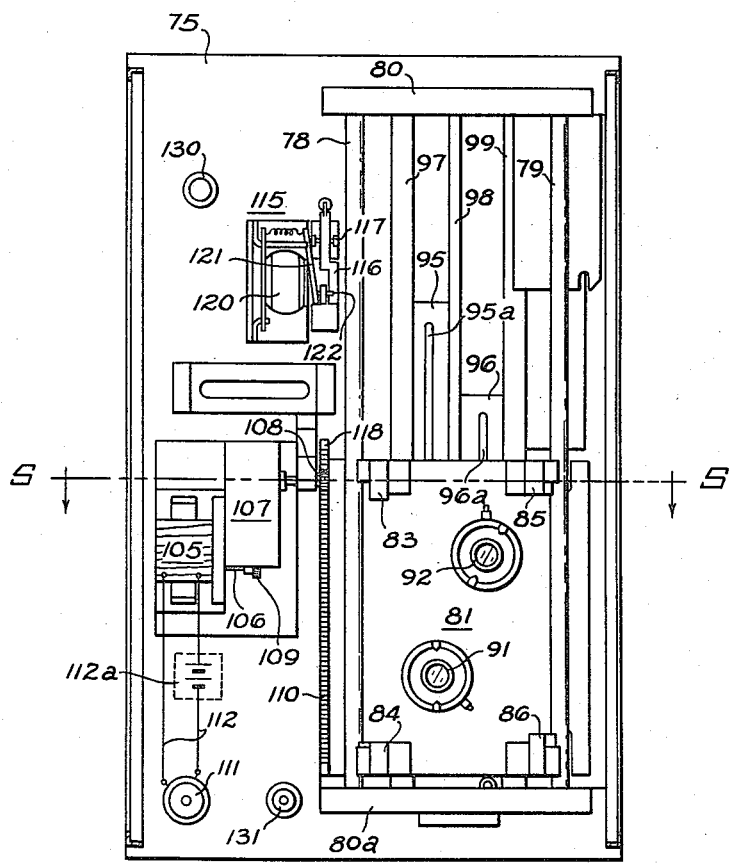
Figure 5:
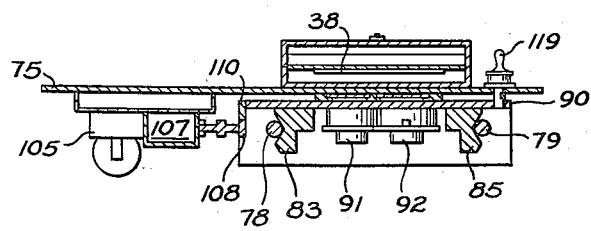

Fig. 3 schematically illustrates the monitoring camera;

Fig. 4 is a view of the lens carriage system to be associated with the system illustrated in Fig. 3;

Fig. 5 is a sectional view taken along the lines 5—5 of Fig. 4;

Fig. 6 illustrates in detail the speed control mechanism for the carriage of Fig. 4;

Fig. 7 illustrates a dual curvature lens embodied in the monitoring camera; and

Fig. 8 is an overall view of the monitoring camera with one side removed.

Figure 1:
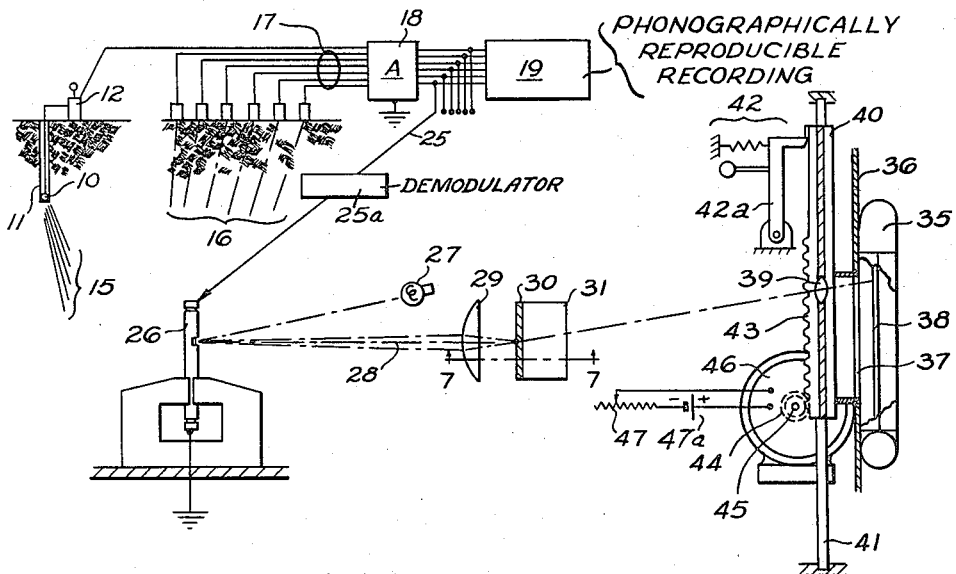
Fig. 1 illustrates a seismic exploring system including the present invention.

Referring now to Fig. 1, a seismic exploring system is illustrated as including an explosive charge 10, positioned in a bore hole 11, to be detonated upon actuation of a blaster 12. Seismic reflection energy, which may for the present purpose be considered as following the rays or paths 15 and 16 as they course to and from a subsurface reflecting interface, actuates a plurality of detectors at the earth's surface which are connected by means of cable 17 to an amplifying system 18. The output of the amplifying system 18 is applied to a system 19 for producing a phonographically reproducible record.

To provide a monitor record that may be visually evaluated, in accordance with the present invention electrical signals representative of the outputs of the amplifier simultaneously are impressed on an auxiliary recorder and a secondary record is produced. More particularly, a coupling to galvanometer 26 by way of a signal channel or conductor 25 has been illustrated for one channel. The galvanometer 26 forms a part of the monitoring unit. The mirror in galvanometer 26 produces movement of a beam of light emanating from the source 27 in a plane normal to the plane of the drawing and in a plane defined by the ray 28. The diverging beam reflected from the galvanometer mirror passes through a condensing lens 29 onto a ground glass plate 30. Plate 30 has one surface provided with light scattering properties to produce an apparent image of the beam. The plate 30 is secured to or is positioned immediately adjacent a clear double curvature directing lens 31. The image of the light beam produced on the face of the plate 30 and as projected by lens 31 is then photographed by a mechanism which includes a pair of movable lenses which focuses the spot or image onto a stationary film of the self-developing type.

More particularly, the film holding and developing components of a camera 35 of the self-developing type, such as currently manufactured and marketed under the trade name Polaroid-Land Camera, are mounted preferably on the exterior wall of plate 36 adjacent an opening 37 in the plate. Thus a film 38 is positioned for exposure by light passing through a lens 39. As will hereinafter be further explained, precautions are taken to prevent entry of light into the camera 35 from any source other than lens 39. Lens 39 is mounted on a carriage 40 which is adapted for slide movement in a direction parallel to the plane of the ground glass plate 30 and also in a direction normal to the movement of the spot on the ground glass produced by movement of the mirror in galvanometer 26. A carriage guide, here illustrated as including a rod 41, is provided to direct the carriage movement. The carriage is initially restrained in an elevated position being provided with a latching mechanism 42. A gear rack 43 mounted on the carriage 40 extends along the direction of movement of the carriage for co-action with a pinion 44 mounted on the shaft 45 of an electromechanical speed control device 46. When the latch 42a is actuated releasing carriage 40, the carriage drops under the pull of gravity to move lens 39 along the length of film 38. If the image on the plate 30 is stationary the film 38 will be exposed along a straight line, or if the spot moves such movements will be impressed or reproduced on film 38. The velocity at which carriage 40 moves to expose film 38 is controlled by varying the controller circuit 47—47a. The speed control device is later described in more detail.

The recorder 19 for producing a phonographically reproducible record will be energized simultaneously with the release of carriage 40. Thereafter the explosive charge 10 is detonated and the seismic waves detected and recorded both in recorder 19 and on film 38. The medium in recorder 19 may then be stored for later study, but the film 38 is developed and immediately checked in order better to chart the course of the seismic effort to follow. It has been found that although the length of the film 38 is but a minor fraction of the length of conventional seismic records, the seismic data impressed thereon is defined with sufficient clarity to give the operator an immediate indication of the character of the phonographically stored data.

Figure 2:
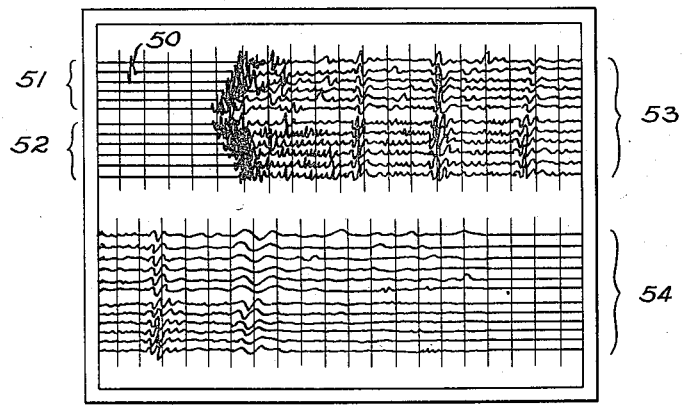
Fig. 2 is a specimen monitoring record.

A typical record has been reproduced in so far as is possible in Fig. 2 to illustrate that all the data conventionally recorded on a seismic record is here available for use either as a monitoring tool or as an ultimate record of extremely convenient size. Here the conventional time break is shown as occurring at point 50. The top six traces 51 correspond with the amplified outputs of the geophones of Fig. 1 The bottom six traces 52 may correspond with a mixture or blending of the signals on traces 51 as is conventional practice. The traces on the portion 53 of Fig. 2 are impressed on film 38, Fig. 1, during the first half of the travel of lens 39 from an elevated position to its rest position. As will hereinafter be described, a second lens is mounted in the carriage 40 for production of the portion 54 of the record of Fig. 2 during the second half of its travel from an elevated position to a rest position. Thus two spaced time components of the same signal are recorded at each lengthwise position of the film of Fig. 2 The film is thus utilized to a maximum advantage giving as great a time-definition as is possible on a limited film length. The record, such as illustrated in Fig. 2, which ordinarily may have a size in the order of four inches by five inches, may be enlarged for more detailed study or may be filed as an index to the corresponding non-visual record from recorder 19.

Referring now to Fig. 3, the optical system of the camera has been illustrated and where consistent like parts have been given the same reference character as in Fig. 1. A lens system is provided in the housing 60 for directing the light beam 61 from a lamp housed in a compartment 62. The galvanometer 26 with its associated magnet system 26a is mounted with the galvanometer disposed horizontally. A mirror 63 is rotatably mounted in a rack 64 in the path of the light beam 61 after its reflection from galvanometer 26. The light beam 61 is then directed by adjustment of mirror 63 downward on to the condensing lens 29 and thence onto the ground face of plate 30. The dual curvature lens 31 is mounted with the plate 30 in a bracket including members 65 and 66 which support the plate 30 and lens 31 from the mounting 64. The lens 39 is then chosen and positioned as to be at conjugate distances from the plane of the plate 30 and from the associated film. As is here illustrated, the light path for the lens 39 includes the mirror 70 upon which movements of the spot as effected by galvanometer 36 in an inclined plane then appear in the field of view of lens 39 in a horizontal plane. Vertical movement of the lens 39 in its associated carriage will be normal to the apparent plane and to the apparent movements of the image of the beam image 61 as it appears on the face of the ground glass plate 30.

Figs. 4 and 5 illustrate in some detail the mechanism for movably supporting the camera lens system. A plate 75 corresponding with plate 36 of Fig. 1 conveniently serves as one side of the camera housing and is adapted to be secured to the edges 76 and 77 of the housing of Fig. 3. Two cylindrical rods 78 and 79 are supported in a vertical position parallel to the plane of the plate 75 as by an upper bracket 80 and a lower bracket 80a both secured as by screws or other means (not shown) to the inner face of the plate 75. A lens carriage 81 includes a pair of guide followers 83 and 84 coacting with the guide rod 78 and a second pair of guide followers 85 and 86 which co-act with the guide rod 79. In Fig. 5 two of the guide followers, the followers 83 and 85, may be seen. Each follower comprises a block recessed respectively on opposite sides as to face the guide rods 78 and 79, respectively, whereby the carriage 81 may be moved up or down in the slideway formed by the rods 78 and 79. The guide followers are secured to a lens carrying plate 90. As illustrated, a pair of lenses 91 and 92 are mounted on the plate 90. The spacing of the lenses 91 and 92 in a direction parallel to the guide rods preferably is slightly less than the length of the film to be exposed. Their spacing in a lateral direction ordinarily is approximately one-half the width of the film to be exposed. The distance of travel of the carriage 81 under the control of the guide rods 78 and 79 is preferably made slightly greater than twice the longitudinal spacing of the lenses whereby the exposures from lens 91 just prior to the center of its downward traverse will correspond with exposures from upper lens 92 at the middle of its downward traverse to tie in time the two record segments.

A pair of slotted baffles 95 and 96, best seen in Fig. 4 are slidably mounted against the inner face of the plate 75 and are maintained in this relation by means of guides 97, 98 and 99. The slots 95a and 96a register with the lenses 91 and 92, respectively, and function to permit passage of light through the wall 75 during preselected portions of the travel of the carriage 81. All parts of the moving system when carefully machined and fitted and coated with a flat black paint limit exposure of the film 38 to light that passes through lenses 91 and 92 only.

The speed of travel of the carriage 81 is controlled by an electromagnetic device 105 which includes an armature (not shown in Figs. 4 or 5) mounted on shaft 106 and driven by means of a step-up gear train 107 which includes as an input a pinion 108 and as an output a pinion 109, the latter being mounted on shaft 106. The pinion 108 is actuated under the control of a rack 110 mounted on plate 90 which is mounted on and moves with the carriage 81. A variable resistance 111 is connected by way of conductors 112 and battery 112a (shown schematically) to the field windings of the device 105 thereby to control the reaction of the electromagnetic device on the shaft 106. By adjustment of the variable resistance 111 the carriage may be caused to make a complete traverse in but a portion of a second to record a limited segment of a selected seismic record, or it may be restrained for slower travel, in the order of three or four seconds, to record a complete seismogram.

The operation of the speed control device may better be understood by reference to Fig. 6 where like parts have been given the same reference character as in Figs. 4 and 5. The electromagnetic device 105 includes a field winding 105a mounted on one side of a magnetic core 105b. The variable resistance 111 is connected in series with the current source 112a to control the intensity of unidirectional magnetic flux passing through the armature 106a. Armature 106a is positioned in a cylindrical air gap in the core 105 and in a preferred form includes a highly conductive sleeve 106b, such as of copper, sweated onto a magnetic core 106c which in turn is carried by shaft 106. When the shaft 106 is rotated by movement of the carriage 81, Fig. 4, eddy currents in the outer shell 106b react with the magnetic flux produced by current from battery 112a to introduce into the moving carriage system a retarding force which is controlled by adjustment of the resistance 111.

As shown in Fig. 4 only, an electromagnetically operating latching mechanism is provided for initiating travel of the carriage 81 in response to a predetermined magnitude of the condition to be photographically recorded. This might be accomplished by means of a control common to both the recorder 19 and to the latching mechanism 42 of Fig. 1. As illustrated in Fig. 4, a latch bar 116 is pivotally mounted on a shaft 117. The latch bar 116 is provided with a catch which registers with the upper end 118 of the rack 110. (A handle 119, Fig. 5, fastened to the carriage plate 90 and extending through the face plate 75 serves as a means to raise carriage 81 to an upper latched position. A relay coil 120 is designed to actuate an armature 121 which pulls pin 122 with it to permit the latching bar 116 is to be retracted and thus release carriage 81. Pilot lights 130 and 131 mounted on plate 75 are connected to selected circuits in the camera for monitoring its action.

The operation of the dual curvature lens 31 of Figs. 1 and 3 may best be understood by reference to Fig. 7. This lens is provided to produce images of the light beams 61a and 61b from the galvanometer bank 26a on the face 30a of plate 30 that appear, when viewed from the position of lens 39, to be of equal intensity. That is, to record on a film spot images from the outer edges of the plate 30 of intensity equal to spot images near the center of the plate 30. Absent such a lens the tendency would be for spots at the center of the plate 30 to appear much brighter than those at its edges. By providing curvature at the fringe areas of the field plate 30, the beams 61a and 61b are directed generally toward lens 39 and even though in practice a pair of lenses are used in a spaced apart relation and are moved with respect to the lens 30 in the course of recording the seismogram, the field as viewed by the lens is so modified by the presence of the dual curvature lens 31 that substantially equal intensity traces are ultimately recorded.

In Fig. 8 the camera is shown with one side removed. Like parts have been given the same reference characters as in Figs. 3-5 where it appeared consistent to do so. The film holder 35 is mounted on the outside face of the plate 75. The carriage handle 119 operates in a slot 119a in the face of the plate 75. Rosettes 130a and 131a illuminated by pilot lights 130 and 131, respectively (not shown), indicate selected operating conditions in the camera. A suitable control handle 111a is provided for the resistance 111.

Interior of the housing there is seen the bracket 64 supporting a mirror structure 63, condensing lens 29, ground glass plate 30 and the double curvature lens 31. The mirror 70 serves to bend the light path between the glass plate 30 and the lenses associated with the film holder 35. Suitable connecting plugs 140 are provided for completing power circuits to the various light sources in the camera and for completing signal circuits to the galvanometers mounted in the magnet structure 26a.

It will now be appreciated that in operation of the system the camera shown in Fig. 8 will be actuated to produce a photographic record coincident with production of the phonographically reproducible recording in the system 19 of Fig. 1. A seismic observer before disturbing in any way the physical system used for detecting and amplifying seismic waves will develop in situ the film in the film holder 35, producing a record of the type shown in Fig. 2. By study of such a record the observer may then evaluate the quality of his phonographically reproducible record. If it is indicated to be necessary, the observer may at that same station order detonation of an additional explosive charge to produce a second recording after suitable steps have been taken to correct or improve upon the first record. A camera of the self-developing type is preferred because the necessity for providing chemicals to develop seismic records as in the conventional case is completely eliminated releasing not only the developing space required in a field recording unit but also eliminating the attendant corrosion accelerating action in and around complex electronic equipment by the proximity to such chemicals.

In producing phonographically reproducible records it has been generally found that frequency modulated magnetic recording techniques are superior to other procedures considered. Since conventional galvanometers such as galvanometer 26, Fig. 1, would not be suitable for recording FM signals, a separate set of amplifiers may be provided for the monitoring camera in addition to amplifiers 18, Fig. 1. Alternatively, circuits leading from the output of the amplifiers 18 to the galvanometers, for example such as circuit 25 leading to galvanometer 26, may include a discriminator or demodulator 25a for deriving from the frequency modulated signal, signals suitable for actuation of the galvanometers.

Further, if desired, the camera shown in Fig. 8 may be used as an independent unit to produce physically small seismic records of high resolution. Such records may be used as primary records either in the form shown in Fig. 2 or after undergoing photographic enlargement processes. In either case the physically small seismic recording will find direct application in an improved seismic field technique.

While the invention has been illustrated and described by certain modifications thereof, it is to be understood that further modifications may now suggest themselves to those skilled in the art and it is intended to cover such modifications as fall within the scope of the appended claims.

What is claimed is:

1. In an oscillographic camera having a light source focused onto a rotatable galvanometer mirror, the combination which comprises a self-developing film positioned in the path of light reflected from said mirror, a light scattering surface intermediate said mirror and said film, a lens positioned between said surface and said film with the surface of said lens which faces said film being cylindrical with respect to an axis normal to movements of said light beam produced by rotation of said galvanometer, and a lens for focusing the spot produced on said scattering surface onto said film and movable lengthwise of said film and adjacent thereto in a direction normal to movements of said spot upon rotation of said galvanometer.

2. A recording oscillograph comprising means for deflecting a beam of light in a first plane with a magnitude representative of the instantaneous values of the magnitude of a condition, a lens for viewing said beam of light at said plane, a camera of the self-developing type having film positioned at a distance conjugate the distance from said lens to said plane, a carriage supporting said lens for movement in a second plane parallel to said first plane and perpendicular to the direction of movement of said beam in said first plane and including means for producing constant speed variation in the relative position of said lens and said beam of light, and means for controlling the initiation of said relative movement in correlation with a selected magnitude of said condition.

3. In a photographic recorder for producing on a film a record of variations in the magnitude of a condition the combination which comprises means for producing in a field indications of a light-variable type representative of variations in the magnitude of said condition, a photosensitive film facing said field, and a pair of lenses mounted for movement along one dimension of said film and comprising the only paths for travel of light from said field to said film and positioned at conjugate distances from said film and from said field with said lenses spaced one from another along the direction of movement of said film and spaced laterally with respect to said direction to produce exposures of said film at corresponding lateral points along said film in the direction of travel of said lenses of different time components of the variations in said condition.

4. In a photographic recorder for producing on a film a record of variations in the magnitude of a condition the combination which comprises means for producing in a field indications of a light-variable type representative of variations in the magnitude of said condition, a photosensitive film facing said field, and a pair of lenses mounted for movement along one dimension of said film and comprising the only paths for travel of light from said field to said film and positioned at conjugate distances from said film and from said field with said lenses spaced along the direction of movement a distance approximately the length of said film to be exposed and spaced laterally with respect to said direction approximately one-half the lateral dimension of the exposure area of said film to produce exposures of said film at corresponding lateral points along said film in the direction of travel of said lenses of different time-spaced components of the variations in said condition.

5. Means for recording on a film variations in the magnitude of a condition which comprises a housing, means for producing light indications representative of said variations in said housing, means for supporting said film from said housing, a pair of lenses mounted in said housing for movement along one dimension of said film and at conjugate distances from said film and from said indications with said lenses spaced along said dimension a distance approximately equal the length of said film to be exposed and spaced laterally with respect to said dimension approximately one-half the lateral dimension of said film, and means for moving said lenses at a constant velocity to produce exposures of said film at laterally spaced points representative of time-spaced time-variations of said indications.

6. A recording oscillograph comprising means for deflecting a beam of light in a plane with a magnitude representative of instantaneous values of the magnitude of a condition, a light diffusing planar element in the path of said beam upon which there appears an apparent source of light varying in said plane in response to deflections of said beam, a photo-sensitive surface in an apparent light source viewing position, a pair of lenses between said apparent light source and said film and spaced at conjugate distances therefrom and comprising the only paths for travel of light from said image to said film, and a carriage supporting said lenses for movement along one dimension of said film with said lenses spaced both in the direction of said dimension and in a direction normal thereto for impressing at each point on said film along lines parallel to said dimension different time components of the variations in said condition.

7. A recording oscillograph comprising means for deflecting a beam of light in a plane with a magnitude representative of instantaneous values of the magnitude of a condition, a pair of lenses receiving said light beam, a camera of the self-developing type adapted to support a film at an image receiving position with respect to said lenses, and a carriage supporting said lenses for relative movement between said lenses and said light beam with said lenses spaced apart in the direction of movement of said carriage and in the direction of movement of said light beam for producing at the same location lengthwise of said film but spaced laterally thereon different time-spaced components of said condition.

8. A recording oscillograph comprising means for deflecting beams of light in a plane with magnitudes representative of instantaneous values of the magnitudes of measurable conditions, means in said light path for producing a plurality of images of said beams, a pair of lenses for viewing said images, a camera of the self-developing type adapted to receive a film at a distance from said lenses conjugate the distance between said image producing means and said lenses, and supporting means for said lenses movable in a second plane mutually perpendicular to said first plane and to the direction of movement of said beams in said first plane with said lenses spaced apart both in the direction of movement thereof and in the direction of movement of said light beams for exposing at the same lengthwise location on said film in a laterally spaced relation time-spaced components of said conditions.

9. A recording oscillograph comprising means for deflecting a beam of light in a first plane with a magnitude representative of the instantaneous values of the magnitude of a condition, a lens for viewing said beam of light at said plane, a camera of the self-developing type having film positioned a distance conjugate the distance from said lens to said plane, a carriage means for producing relative movement between said lens and said camera in a second plane parallel to said first plane and perpendicular to the direction of deflection of said beam in said first plane and including constant speed means for controlling said relative movement, and means for controlling the initiation of said relative movement in correlation with a selected magnitude of said condition.

10. A recording oscillograph comprising means for deflecting a beam of light in a first plane with a magnitude representative of the instantaneous values of the magnitude of a condition, means including a light-transmitting, light-scattering surface positioned in the path of said beam for producing a spot image thereof with divergent rays of light emanating therefrom, a focusing lens located to receive said divergent rays, a camera having film positioned a distance conjugate the distance from said lens to said light-scattering surface, actuating means including a speed controller for producing constant-speed relative movement between said lens and the film of said camera comprising structure for moving one of them in a plane parallel to the plane of said light-scattering surface and in a direction perpendicular to the direction of deflection of said beam, and means for controlling said actuating means to initiate said constant-speed movement of said structure to establish a time base for the recording on said film of said instantaneous values of the magnitude of said condition.

11. A recording oscillograph comprising a light-tight housing having an aperture in one wall of substantial length, means within said housing for deflecting a beam of light in a first plane with a magnitude representative of the instantaneous values of the magnitude of a condition, means including a light-transmitting, light-scattering surface positioned in the path of said beam for producing a spot image thereof with divergent rays of light emanating therefrom and encompassing said aperture, a focusing lens located adjacent said aperture to receive said divergent rays and to bring them to a spot outside said housing, a recording camera having its film located a distance conjugate the distance from said lens to said light-scattering surface, means for supporting said camera from a wall of said housing with the film in view of said aperture, and means including a speed controller for producing constant-speed relative movement between said lens and the film of said camera comprising structure for moving one of them in a plane parallel to the plane of said light-scattering surface and in a direction perpendicular to the direction of deflection of said beam for the recording on said film of said instantaneous values of the magnitude of said condition against a time base determined by the magnitude of said constant-speed relative movement.

12. The recording oscillograph of claim 11 in which there are a pair of said focusing lenses located adjacent said aperture and spaced one from the other a distance approximately equal to the length of film to be exposed and spaced laterally one from the other approximately one-half the lateral dimension of the film.

13. A recording oscillograph comprising a light-tight housing having an aperture in one wall of substantial length, means within said housing for deflecting a beam of light in a first plane with a magnitude representative of the instantaneous values of the magnitude of a condition, means including a light-transmitting, light-scattering surface positioned in the path of said beam for producing a spot image thereof with divergent rays of light emanating therefrom and encompassing said aperture, a focusing lens located adjacent said aperture to receive said divergent rays and to bring them to a spot outside said housing, a recording camera of the self-developing type having its film located a distance conjugate the distance from said lens to said light-scattering surface, means for supporting said camera from a wall of said housing with the film in view of said aperture, and means including a speed controller for producing constant-speed relative movement between said lens and the film of said camera comprising structure for moving one of them in a plane parallel to the plane of said light-scattering surface and in a direction perpendicular to the direction of deflection of said beam for the recording on said film of said instantaneous values of the magnitude of said condition against a time base determined by the magnitude of said constant-speed relative movement, said camera having a back movable from a closed to an open position for removal therefrom of a developed record of changes in the magnitude of said condition during a predetermined time interval.

14. A system for recording seismic information which comprises means for impressing a varying magnetic field in a space relation along the length of a magnetic storing medium representative of time-variations of seismic signals, means for simultaneously deflecting a beam of light across a first plane to produce a moving spot of light in said plane which varies in position with a magnitude representative of the time-variations in said seismic signals, a lens for viewing said beam of light at said first plane, a camera of the self-developing type having film positioned a distance conjugate the distance from said lens to said plane, a carriage means for producing relative movement between said lens and said camera in a second plane parallel to said first plane and perpendicular to the direction of deflection of said beam in said first plane and including constant speed means for controlling said relative movement, and means for controlling the initiation of said relative movement in predetermined time relation with the impression of said varying magnetic field on said magnetic storing medium.

15. A recording oscillograph comprising means for deflecting a beam of light in a first plane with a magnitude representative of the instantaneous values of the magnitude of a condition, means including a light-transmitting, light-scattering surface positioned in the path of said beam for producing a spot image thereof with divergent rays of light emanating therefrom, a focusing lens located to receive said divergent rays, a fixed lens associated with said light-transmitting, light-scattering surface having a cylindrical surface facing said focusing lens for modifying the light paths of said divergent rays, a camera having film positioned a distance conjugate the distance from said focusing lens to said light-scattering surface, actuating means including a speed controller for producing constant-speed relative movement between said focusing lens and the film of said camera comprising structure for moving one of them in a plane parallel to the plane of said light-scattering surface and in a direction perpendicular to the direction of deflection of said beam, and means for controlling said actuating means to initiate said constant-speed movement of said structure to establish a time base for the recording on said film of said instantaneous values of the magnitude of said condition.

16. A recording oscillograph comprising means for deflecting a beam of light in a first plane with a magnitude representative of the instantaneous values of the magnitude of a condition, means including a light-transmitting, light-scattering surface positioned in the path of said beam for producing a spot image thereof with divergent rays of light emanating therefrom, a spherical focusing lens located to receive said divergent rays, a camera having film positioned a distance conjugate the distance from said lens to said light-scattering surface, actuating means including a speed controller for producing constant-speed relative movement between said lens and the film of said camera comprising structure for moving one of them in a plane parallel to the plane of said light-scattering surface and in a direction perpendicular to the direction of deflection of said beam, and means for controlling said actuating means to initiate said constant-speed movement of said structure to establish a time base for the recording on said film of said instantaneous values of the magnitude of said condition.

17. A system for recording seismic information which comprises means for impressing a varying magnetic field in a space relation along the length of a magnetic storing medium representative of time-variations of seismic signals, means for simultaneously deflecting a beam of light in a first plane with a magnitude representative of the time-variations in said seismic signals, a lens for viewing said beam of light at said first plane, a camera of the self-developing type having film positioned a distance conjugate the distance from said lens to said plane, a carriage means for producing relative movement between said lens and said camera in a second plane parallel to said first plane and perpendicular to the direction of deflection of said beam in said first plane and including constant speed means for controlling said relative movement, means for controlling the initiation of said relative movement in predetermined time relation with the impression of said varying magnetic field on said magnetic storing medium, and means for controlling the initiation of said relative movement in correlation with a selected magnitude of said condition.

References Cited in the file of this patent

UNITED STATES PATENTS

| | | |
|---|---|---|
| 1,216,272 | Berry | Feb. 20, 1917 |
| 1,441,635 | Rived | Jan. 9, 1923 |
| 1,871,380 | Legg | Aug. 9, 1932 |

(Other references on following page)

UNITED STATES PATENTS

| | | |
|---|---|---|
| 2,062,151 | Weatherby | Nov. 24, 1936 |
| 2,095,676 | Prescott | Oct. 12, 1937 |
| 2,240,028 | Bader | Apr. 29, 1941 |
| 2,243,729 | Ellis | May 27, 1941 |
| 2,435,717 | Land | Feb. 10, 1948 |
| 2,615,778 | Butz | Oct. 28, 1952 |
| 2,620,890 | Lee et al. | Dec. 9, 1952 |
| 2,626,381 | Olson | Jan. 20, 1953 |
| 2,665,481 | Henry | Jan. 12, 1954 |
| 2,692,370 | Moore | Oct. 19, 1954 |
| 2,697,648 | Kerr et al. | Dec. 21, 1954 |

OTHER REFERENCES

Jakosky et al.: Publication—"Frequency Analysis of Seismic Waves," pages 721–738, Geophysics Magazine, vol. 17, No. 4, October 1952.